Oct. 18, 1949.  R. D. ACTON  2,484,800
FERTILIZER SPREADER
Filed March 19, 1945
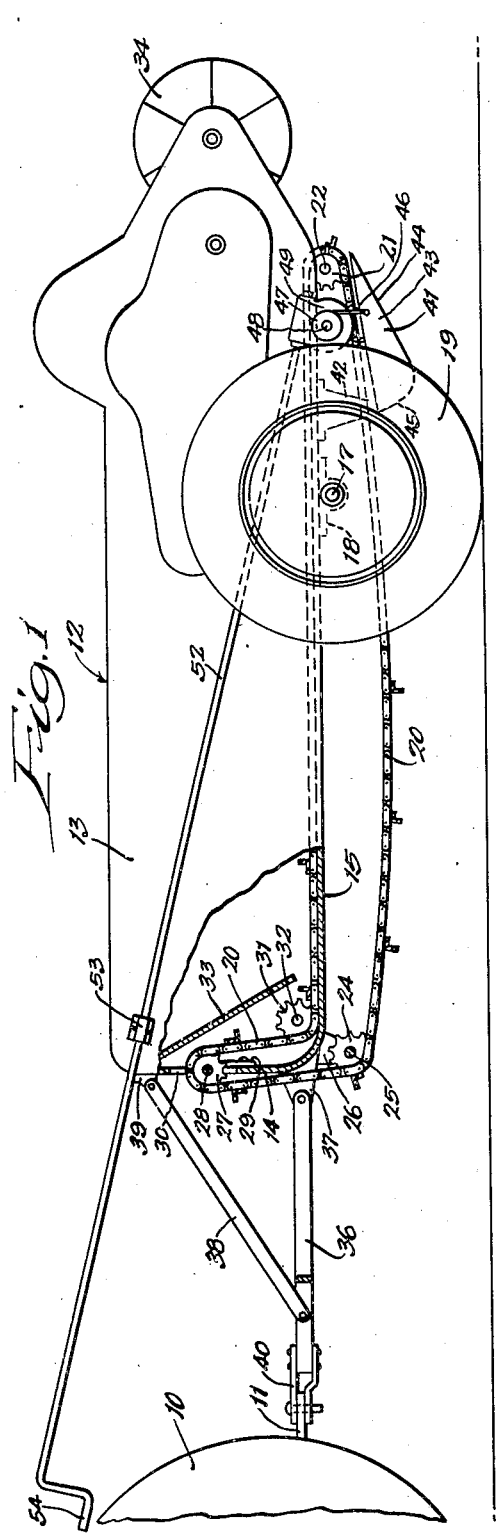
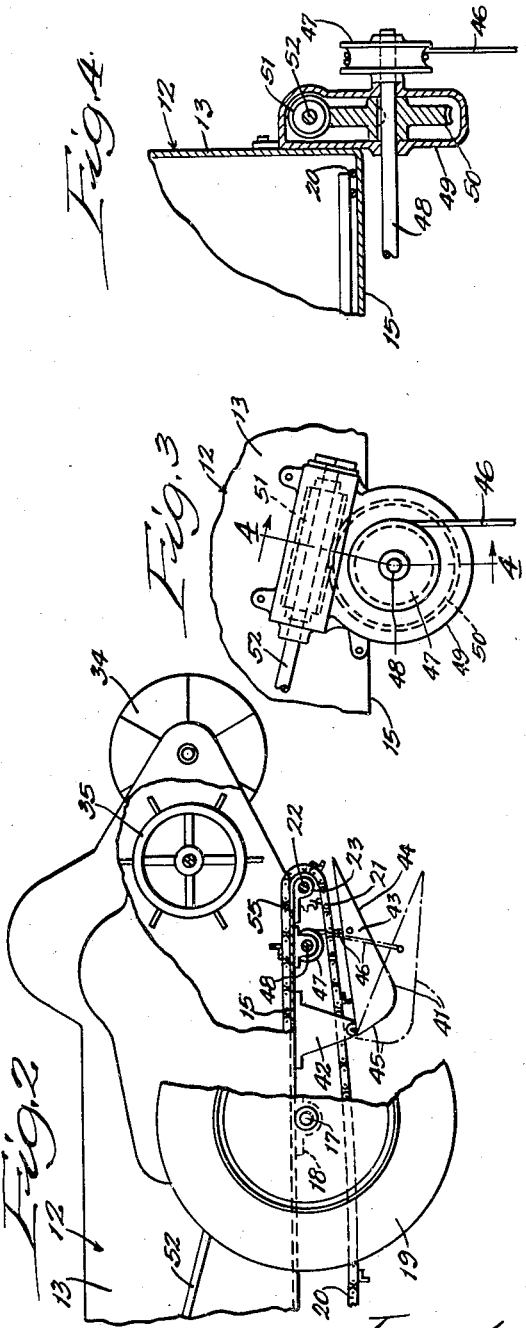
Inventor:
Russel D. Acton,
By Paul O. Pippel
Attorney.

Patented Oct. 18, 1949

2,484,800

UNITED STATES PATENT OFFICE 2,484,800

FERTILIZER SPREADER

Russel D. Acton, Chicago, Ill., assignor to International Harvester Company, a corporation of New Jersey Application March 19, 1945, Serial No. 583,455

13 Claims. (Cl. 275—5)

1

This invention relates to a fertilizer spreader. More particularly, it relates to a liquid-handling attachment for a manure spreader. Most of the manure spreaders heretofore known and used have been adapted only for handling manure in solid form. Agriculturists are now stressing the value of the liquid portion of the fertilizer which ordinarily is lost. It is therefore desirable to provide a spreader which will be able to retain and distribute the liquid portion of the fertilizer. The Griffiths Patent 2,360,125, October 10, 1944, discloses and claims a liquid-tight body for a fertilizer spreader constructed so that the liquid may be transported and spread in the field. In addition to the use of this type of spreader, there are many instances where farmers already have a conventional spreader and desire some means to utilize it for hauling and spreading liquid fertilizer or particularly fertilizer having a significant percentage of liquid which would be lost in a conventional spreader.

The principal object of the present invention is to provide a fertilizer spreader particularly designed to handle manure containing a substantial quantity of liquid.

Another principal object is to provide an attachment for a conventional conveyor or apron type of manure spreader by means of which manure may be hauled and spread containing a substantial quantity of liquid without losing the valuable liquid component.

Other important objects and desirable features of the invention will become apparent to those skilled in the art as the disclosure is more fully made in the following detailed description and the accompanying drawings, in which:

Figure 1 is a side elevation particularly broken away in section to show the principal parts of a structure incorporating the invention and their relationship in a spreader construction;

Figure 2 is an elevation showing the rear portion of the spreader of Figure 1, with a portion broken away by a vertical longitudinal section to better illustrate the invention;

Figure 3 is an enlarged detail of the pan lifting structure shown in Figure 1; and Figure 4 is a section taken on the line 4—4 of Figure 3.

Fertilizer spreaders of the type disclosed in the drawings are ordinarily used in conjunction with tractors, the rear portion of a tractor including a traction wheel 10 and a draw-bar 11 as illustrated in Figure 1. The spreader consists essentially of an all-metal body designated in its entirety by the reference character 12. Said body

2 has side walls 13, a front wall 14, and a substantially horizontal bottom 15. An axle 17 rotatably supported beneath the bottom rearwardly of the center thereof by brackets 18, as indicated in Figures 1 and 2, carries supporting wheels 19. A conventional slatted conveyor 20 is shown as extending over the upper portion of the bottom, out through the rear open end of the spreader body and over sprockets 21 carried on a supporting shaft 22 supported by brackets 23 as shown in Figure 2. Said conveyor extends forwardly beneath the bottom of the spreader over sprockets 24 carried on a shaft 25 supported by brackets 26. From said sprockets the conveyor extends upwardly over sprockets 27 carried by a shaft 28 carried by brackets 29. A transverse opening 30 in the front wall 14 of the spreader provides means for extending the conveyor through the front wall into the spreader body. Within the spreader body the conveyor extends downwardly over sprockets 31 carried by shaft 32 and therefrom forwardly along the upper surface of the bottom 15. A deflector wall 33 extends from the upper portion of the front end wall 14 downwardly over the sprockets 27 and 31 to prevent material of the load engaging said sprockets and the portion of the conveyor extending therebetween.

A wide spread beater 34 is indicated at the rear of the spreader, and in Figure 2 a distributor beater 35 is shown for removing material from the load and delivering it to the wide spread beater 34.

A draft structure is shown at the front of the spreader which includes a pair of draft members 36 connected to the front of the spreader body 14 by brackets 37. Said members are adjacent each other at their forward ends and diverge at their rear ends for connection with the brackets 37. In Figure 1 one of the members 36 on the far side is shown in full lines including its connection with one of the brackets 37. In said figure the rear of the body has been broken away to show the conveyor drive construction with the member 36 at that side being also broken away as indicated in section adjacent its forward end. The draft structure also includes a brace member 38 extending upwardly and connected by a bracket 39 to the front wall 14 of the spreader body. A clevis structure 40 provides means for connecting the draft structure to the draw-bar 11 of the tractor.

At the rear of the spreader a liquid retaining pan 41 is pivotally connected at its forward end to brackets 42 connected to the bottom 15 of the spreader adjacent the side walls 13 and extending downwardly therefrom. Said pan includes side walls 43 and a bottom 44 sloping upwardly from a front wall 45, whereby when the pan is dropped into the dotted line position indicated in Figure 2 the liquid material is drained therefrom.

At points on the side walls 43 of the pan spaced rearwardly from its pivotal connection on the brackets 42, flexible cable-like elements 46 are connected. Said elements extend upwardly and around pulleys 47 which are mounted on a transverse shaft 48 extending beneath the spreader body. Said shaft is supported by bracket structures at each side of the spreader body, the structure 49 at one side, as indicated in Figure 4, including a housing in which a worm gear 50 is mounted. Said gear is keyed on the shaft 48 and is adapted to be driven by a worm 51 also mounted in the housing. Said worm is provided with a shaft 52 extending forwardly and upwardly out of the housing structure. Said shaft is continued forwardly and upwardly, being supported near the front of the spreader by a bracket 53 on the side wall 13 at its side of the spreader. The shaft or rod 52 extends forwardly over the draft structure and over the draw-bar 11 of the tractor terminating in a crank 54 located adjacent the operator's station on the tractor. By operating the crank 54 in one direction the cable-like elements 46 are wound on the pulleys 47 to lift the pan 41 to the positon shown in solid lines in Figure 2. By operating the crank 54 in the other direction the pan is dropped to the dotted-line position also shown in Figure 2.

In using a spreader as above described, the manure including liquid contained therewith is loaded into the spreader body. The location of the opening 30 in the front end wall 14 is at a sufficiently high level so that no liquid can escape from the front of the tractor body. Any liquid draining along the substantially horizontal bottom 15 of the spreader body to the rear thereof drops over the rear end 55 of the bottom and falls into the pan 41 being retained thereby, it being understood that the pan is in the solid line position as indicated in Figure 2, during loading and standing of the spreader prior to distribution of the fertilizer. Due to the fact that under most farm conditions there is a substantial amount of relatively solid fertilizer or manure having substantial absorbent qualities and only a relatively small percentage of liquid, an operator may, by exercising care in loading the spreader body, limit substantially the amount of liquid which drains rearwardly and out of the spreader prior to the spreading operation. By throwing the more solid portion of the manure into the rear end of the spreader, a dam is provided which prevents the rapid flow and acts to absorb the maximum quantity of liquid before liquid drains out of the spreader body. By throwing the more liquid portions of the fertilizer into the extreme front end a maximum amount of absorbing and damming action is provided by the solid materials loaded at the rear of the spreader body. For that reason a relatively small liquid receptacle such as illustrated by the pan 41 is effective to collect that portion of the valuable liquid constituent of the manure which might otherwise be lost. Under some conditions it may be possible by merely providing a front end construction as illustrated to satisfactorily retain a major portion of the liquid, and it is to be understood that applicant contemplates such a construction as one embodiment of his intention.

All modifications of fertilizer distributors falling within the appended claims are contemplated as applicant's invention.

What is claimed is:

1. A manure spreader construction comprising a wheel supported body having a substantially horizontal bottom and vertical side walls, an open rear end and a front end including an upwardly extending end wall to provide a liquid-tight construction at that end, a conveyor extending over the bottom and upwardly over said end wall, said conveyor adapted to be operated in a rearward direction along the inside of the bottom and having a return portion beneath the bottom, a liquid-receiving container positioned below the bottom and extending beyond the rear end thereof whereby liquid material draining from said bottom is received by the container, said container being pivoted on the spreader body, and means to maintain the container in liquid-receiving position and to tilt the same into a liquid-discharging position.

2. A manure spreader construction comprising a wheel supported body having a substantially horizontal bottom and vertical side walls, an open rear end and a front end including an upwardly extending end wall to provide a liquidtight construction at that end, a conveyor extending over the bottom and upwardly over said end wall, said conveyor adapted to be operated in a rearward direction along the inside of the bottom and having a return portion beneath the bottom, a liquid-receiving container positioned below the bottom and extending beyond the rear end thereof whereby liquid material draining from said bottom is received by the container, said container being pivoted on the spreader body, and means to maintain the container in liquid-receiving position and to tilt the same into a liquid-discharging position, said means extending to within reach of an operator located forwardly of the spreader body.

3. A manure spreader construction comprising a wheel supported body having a substantially horizontal bottom and vertical side walls, an open rear end and a front end including an upwardly extending end wall to provide a liquidtight construction at that end, a conveyor extending over the bottom and upwardly over said end wall, said conveyor adapted to be operated in a rearward direction along the inside of the bottom and having a return portion beneath the bottom, a liquid-receiving container positioned below the bottom and extending beyond the rear end thereof whereby liquid material draining from said bottom is received by the container, said container being positioned below the upper run of the conveyor, said container being pivoted on the spreader body, and means to maintain the container in liquid-receiving position and to tilt the same into a liquid-discharging position.

4. A manure spreader construction comprising a wheeled body having a horizontal bottom and vertical side walls, an open rear end and a front end including an upwardly extending end wall to provide a liquidtight compartment, a conveyor extending over the bottom and upwardly over said upwardly extending end wall, a shielding wall ending downwardly at the front end in overlapping relation with respect to said end wall, said conveyor adapted to be operated in a rearward direction along the bottom and having a return portion beneath the bottom, a liquid-receiving pan positioned below the bottom adjacent the rear of the body, said pan being pivoted on the spreader body and extending rearwardly into overlapping relation with respect to the bottom whereby liquid material draining from said bottom is received by the pan, and means to maintain the pan in liquid-receiving position and to drop the pan into a liquid-discharging position.

5. A manure spreader construction comprising a wheel supported body having a substantially horizontal bottom and vertical side walls, an open rear end and a front end including an upwardly extending end wall to provide a liquidtight compartment, a conveyor extending over the bottom and upwardly over said end wall, said conveyor adapted to be operated in a rearward direction along the inside of the bottom and having a return portion beneath the bottom, a liquid-receiving pan positioned below the bottom adjacent the rear of the body, said pan being pivoted at its forward edge on the spreader body and extending rearwardly into overlapping relation with respect to the bottom whereby liquid material draining from said bottom is received thereby, and means to maintain the pan in liquid-receiving position and to drop the pan into a liquid-discharging position with the bottom in a position to drain liquid contents from the pan.

6. A manure spreader construction comprising a wheel supported body having a substantially horizontal bottom and vertical side walls, an open rear end and a front end including an upwardly extending end wall to provide a liquidtight compartment, a conveyor extending over the bottom and upwardly over said end wall, said conveyor adapted to be operated in a rearward direction along the inside of the bottom and having a return portion beneath the bottom, a liquid-receiving pan positioned below the bottom adjacent the rear of the body, said pan being pivoted at its forward edge on the spreader body and extending rearwardly into overlapping relation with respect to the bottom whereby liquid material draining from said bottom is received thereby, said pan having a bottom wall sloping upwardly in a rearward direction when in liquid-receiving position, and means to maintain the pan in liquid-receiving position and to drop the pan into a liquid-discharging position with the bottom in a position to drain liquid contents from the pan.

7. A manure spreader construction comprising a wheel supported body having a substantially horizontal bottom and vertical side walls, an open rear end and a front end including an upwardly extending end wall to provide a liquidtight compartment, a conveyor extending over the bottom and upwardly over said end wall, said conveyor adapted to be operated in a rearward direction along the inside of the bottom and having a return portion beneath the bottom, a liquid-receiving pan positioned below the bottom adjacent the rear of the body, said pan being pivoted at its forward edge on the spreader body and extending rearwardly into overlapping relation with respect to the bottom whereby liquid material draining from said bottom is received thereby, said pan having a bottom wall sloping upwardly in a rearward direction when in liquid-receiving position, and means connected to the rear portion of said pan to maintain the pan in liquid-receiving position, said means being manually adjustable to lower the pan into a liquid-discharging position with the bottom in a position to drain liquid contents from the pan.

8. A manure spreader construction comprising a wheel supported body provided with a draft structure adapted to be connected to a tractor, said body having a substantially horizontal bottom and vertical side walls, an open rear end and a front end including an upwardly extending end wall to provide a liquidtight compartment, a conveyor extending over the bottom and upwardly over said end wall, said conveyor adapted to be operated in a rearward direction along the inside of the bottom and having a return portion beneath the bottom, a liquid-receiving pan positioned below the bottom adjacent the rear of the body, said pan being pivoted at its forward edge on the spreader body and extending rearwardly into overlapping relation with respect to the bottom whereby liquid material draining from said bottom is received thereby, and means to maintain the pan in liquid-receiving position and to drop the pan into a liquid-discharging position with the bottom in a position to drain liquid contents from the pan, said means including an operating member extending forwardly over the drawbar structure into a position where it can be engaged by a tractor operator during travel of the machine.

9. A manure spreader construction comprising a wheel supported body having a substantially horizontal bottom and vertical side walls, an open rear end and a front end including an upwardly extending end wall to provide a liquidtight construction at that end, a conveyor extending over the bottom and upwardly over said end wall, said conveyor adapted to be operated in a rearward direction along the inside of the bottom and having a return portion beneath the bottom, a liquid-receiving container positioned below the bottom and extending beyond the rear end thereof whereby liquid material draining from said bottom is received by the container, said container being pivoted on the spreader body, and means to maintain the container in liquid-receiving position and to tilt the same into a liquid-discharging position including a transverse shaft mounted beneath the spreader body above the container, means connecting the ends of the shaft to the container at a point spaced rearwardly of its pivot axis, and means to rotate said shaft.

10. A manure spreader construction comprising a wheel supported body having a substantially horizontal bottom and vertical side walls, an open rear end and a front end including an upwardly extending end wall to provide a liquidtight construction at that end, a conveyor extending over the bottom and upwardly over said end wall, said conveyor adapted to be operated in a rearward direction along the inside of the bottom and having a return portion beneath the bottom, a liquid-receiving container positioned below the bottom and extending beyond the rear end thereof whereby liquid material draining from said bottom is received by the container, said container being pivoted on the spreader body, and means to maintain the container in liquid-receiving position and to tilt the same into a liquid-discharging position including a transverse shaft mounted beneath the spreader body above the container, pulleys on said shaft, flexible elements connecting the container at points spaced rearwardly of the pivot axis with said pulleys, and means to rotate said shaft.

11. A manure spreader construction comprising a wheel supported body having a substantially horizontal bottom, vertical side walls, an open rear end and a front end structure including a substantially vertical end wall having a transverse opening therein spaced a substantial distance above the bottom to provide a liquid-retaining portion of the end wall, a transverse rotatable conveyor support mounted in said opening to receive a conveyor at the inside of the end wall and to discharge it at the outside of the end wall, transverse rotatable means positioned inside the body adjacent the end wall and adjacent the bottom wall for receiving the conveyor from said upper supporting structure and delivering it rearwardly along the upper surface of the bottom, a conveyor extending beneath said rotatable means and over the rotatable structure in the end wall and a shield wall extending from adjacent the upper end of the front wall downwardly and rearwardly over the conveyor supporting means to protect said means and said conveyor against material loaded in the spreader body, said wall terminating above the bottom to permit movement of the conveyor, and a tiltable liquid-receiving container positioned at the rear end of the spreader bottom.

12. A manure spreader construction comprising a wheel supported body having a substantially horizontal bottom, vertical side walls, an open rear end and a front end structure including a substantially vertical end wall having a transverse opening therein spaced a substantial distance above the bottom to provide a liquid-retaining portion of the end wall, a transverse rotatable conveyor support mounted in said opening to receive a conveyor at the inside of the end wall and to discharge it at the outside of the end wall, transverse rotatable means positioned inside the body adjacent the end wall and adjacent the bottom wall for receiving the conveyor from said upper supporting structure and delivering it rearwardly along the upper surface of the bottom, a conveyor extending beneath said rotatable means and over the rotatable structure in the end wall and a shield wall extending from adjacent the upper end of the front wall downwardly and rearwardly over the conveyor supporting means to protect said means and said conveyor against material loaded in the spreader body, said wall terminating above the bottom to permit movement of the conveyor, and a tiltable liquid-receiving container positioned below the bottom at the rear end thereof.

13. A manure spreader construction comprising a wheel supported body having a substantially horizontal bottom, vertical side walls, an open rear end and a front end structure including a substantially vertical end wall having a transverse opening therein spaced a substantial distance above the bottom to provide a liquid-retaining portion of the end wall, a transverse rotatable conveyor support mounted in said opening to receive a conveyor at the inside of the end wall and to discharge it at the outside of the end wall, transverse rotatable means positioned inside the body adjacent the end wall and adjacent the bottom wall for receiving the conveyor from said upper supporting structure and delivering it rearwardly along the upper surface of the bottom, a conveyor extending beneath said rotatable means and over the rotatable structure in the end wall and a shield wall extending from adjacent the upper end of the front wall downwardly and rearwardly over the conveyor supporting means to protect said means and said conveyor against material loaded in the spreader body, said wall terminating above the bottom to permit movement of the conveyor, a rotatable conveyor support at the rear end of the bottom, said conveyor extending rearwardly over said support and forwardly under the bottom, and a tiltable liquid-receiving container positioned below the bottom at the rear end thereof beneath the lower run of the conveyor.

RUSSEL D. ACTON.

REFERENCES CITED

The following references are of record in the file of this patent:

UNITED STATES PATENTS

| Number | Name | Date |
|---|---|---|
| 790,583 | Manning | May 23, 1905 |
| 951,073 | Hicks | Mar. 1, 1910 |
| 2,101,967 | Walterspiel | Dec. 14, 1937 |
| 2,314,871 | De Back | Mar. 30, 1943 |
| 2,360,125 | Griffiths | Oct. 10, 1944 |